(12) United States Patent
Karnacewicz et al.

(10) Patent No.: US 6,862,378 B2
(45) Date of Patent: Mar. 1, 2005

(54) SILICON-BASED HIGH SPEED OPTICAL WIRING BOARD

(75) Inventors: Mark Karnacewicz, Norristown, PA (US); John William Osenbach, Kutztown, PA (US); Alexandru Paunescu, Neshanic Station, NJ (US)

(73) Assignee: TriQuint Technology Holding Co., Hillsboro, OR (US)

( * ) Notice: Subject to any disclaimer, the term of this patent is extended or adjusted under 35 U.S.C. 154(b) by 182 days.

(21) Appl. No.: 10/279,408

(22) Filed: Oct. 24, 2002

(65) Prior Publication Data

US 2004/0081385 A1 Apr. 29, 2004

(51) Int. Cl.⁷ .............................................. G02B 6/26
(52) U.S. Cl. ........................ 385/14; 385/88; 385/89
(58) Field of Search .................... 385/14, 83, 88–94

(56) References Cited

U.S. PATENT DOCUMENTS

| | | | | |
|---|---|---|---|---|
| 4,701,609 A | * | 10/1987 | Koishi et al. | 250/205 |
| 5,324,683 A | * | 6/1994 | Fitch et al. | 438/422 |
| 5,798,557 A | * | 8/1998 | Salatino et al. | 257/416 |
| 2002/0057883 A1 | * | 5/2002 | Malone et al. | 385/136 |
| 2003/0047798 A1 | * | 3/2003 | Halahan | 257/685 |
| 2004/0007750 A1 | * | 1/2004 | Anderson et al. | 257/414 |
| 2004/0081498 A1 | * | 4/2004 | Tu | 400/118.2 |
| 2004/0101995 A1 | * | 5/2004 | Sakai et al. | 438/127 |
| 2004/0105611 A1 | * | 6/2004 | Bischel et al. | 385/14 |

* cited by examiner

Primary Examiner—Ellen E. Kim
(74) Attorney, Agent, or Firm—Wendy W. Koba

(57) ABSTRACT

An optical wire board which utilizes a silicon substrate as the base for both the optical subassembly and the electrical RF transmitting circuit. An optical fiber is preferably passively aligned to the active optical device mounted on the optical subassembly using a V-groove etched into the silicon (and may include a lens or other optical element positioned between the fiber and the active device). An integrated circuit for coupling the active optical device to external contacts is preferably flip-chip mounted to the silicon substrate upon pads disposed on precisely defined edges around a cavity etched beneath the circuit, the inclusion of the cavity beneath the electrical circuit functioning to minimize the dielectric loading effect of the silicon substrate on the integrated circuit.

18 Claims, 2 Drawing Sheets

SILICON-BASED HIGH SPEED OPTICAL WIRING BOARD

TECHNICAL FIELD

The present invention relates to optical wire boards. More particularly, the present invention relates to a high speed (e.g., 40 Gb/s) optical wiring board incorporating a silicon substrate into both the optical subassembly and the electrical RF transmission circuit.

BACKGROUND OF THE INVENTION

Due to the rise of the Internet, cellular phones, virtual private networks, and the like, there is a growing need for faster and faster communication systems to handle the tremendous increase in information being transmitted. One of the areas where this demand is the greatest is in the area of optical communications.

Optical transmission systems in the 10 Gb/s range are already becoming commonplace; systems operating at 40 Gb/s (and higher) are now in development. However, the production of high speed transmitters and receivers in the 40 Gb/s range has been greatly hampered due to limitations in the materials used to create the wiring boards on which these components sit.

Traditionally, optical components for these high speed systems have been integrated on a substrate such as aluminum oxide ($Al_2O_3$), wherein active alignment must be used to align the optical elements on the wire board. As an alternative, a combination of a silicon optical bench (SiOB) for the optical devices, and an $Al_2O_3$-based high speed electrical circuit board has been used, incorporating ribbon bonding, flip-chip soldering and/or flex cables to interconnect the two components.

However, these systems of the prior art have significant disadvantages. The active optical alignment required by conventional $Al_2O_3$ wire boards is expensive and cost prohibitive. The active alignment of optical fibers to laser diodes or photodetectors is a time consuming process, which makes automated production extremely difficult. Moreover, the facilities needed to manufacture these systems require a considerable investment with a reasonably large volume production.

As a result, a silicon optical bench (SiOB) is preferable as a substrate for the optical elements. The use of silicon as a substrate allows for the passive alignment of the laser/photodiode (i.e., "active optical device") to the optical fiber, such as through the use of arrays of etched V-grooves in the silicon, reducing production costs. For example, a wafer-scale package process may be used for volume production of hybrid integrated optical components, by using the passive alignment of the precisely cleaved laser diode and semiconductor waveguide onto a micro-machined silicon optical bench.

Alternatively, a batch transporting technique can be employed, in which a micro-machined silicon guiding plate may be used as a processing unit through the entire manufacturing procedure from die bonding to hermetic sealing. Such a system is disclosed in Jan-Jun Koh, et al., *On-Wafer Process for Mass Production of Hybridly Integrated Optical Components Using Passive Alignment on Silicon Motherboard*, the 51st Electronic Components and Technology Conference, Lake Buena Vista, Fla., May 29-Jun. 1, 2001, page 6.

Unfortunately, however, conventional silicon-based wire boards have not been considered as a good choice for the electrical circuit components in high speed optical wire boards, primarily due to excessive RF insertion loss in the silicon.

Accordingly, a system is needed which provides a stable and accurate passive alignment of the optical components on the optical sub-assembly of a high speed optical wire board, while simultaneously achieving satisfactory RF-performance of the electrical circuit mounted on the same substrate.

SUMMARY OF THE INVENTION

The present invention is directed to an optical wire board incorporating a silicon substrate, such as a silicon optical bench (SiOB), as a base for both the optical subassembly and the RF transmitting electrical circuit. An optical element (such as a lens) is preferably passively aligned to the active optical device (which can be, for example, a laser diode or a photodetector) using a V-groove etched into the silicon. An integrated circuit (IC) for coupling the active device to external contacts is preferably flip-chip mounted to the SiOB upon pads disposed around a cavity etched beneath the integrated circuit. The inclusion of a cavity below the integrated circuit serves to minimize the dielectric loading effect of the silicon substrate on the IC (due to the close proximity between the silicon substrate and the IC), thus minimizing the potential for RF performance degradation (detuning) of the network.

Biasing circuitry may also be provided on the silicon substrate and connected to the electrical transmission circuit for operating the active optical device in conjunction with the integrated circuit; the external contacts may be provided on the wire board for connecting the electrical transmission circuit to additional (external) electrical components.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

The present invention will be understood more fully from the detailed description given below and from the accompanying drawings of preferred embodiments of the invention, which, however, should not be taken to limit the invention to a specific embodiment, but are for explanation and understanding only.

Figure 1:
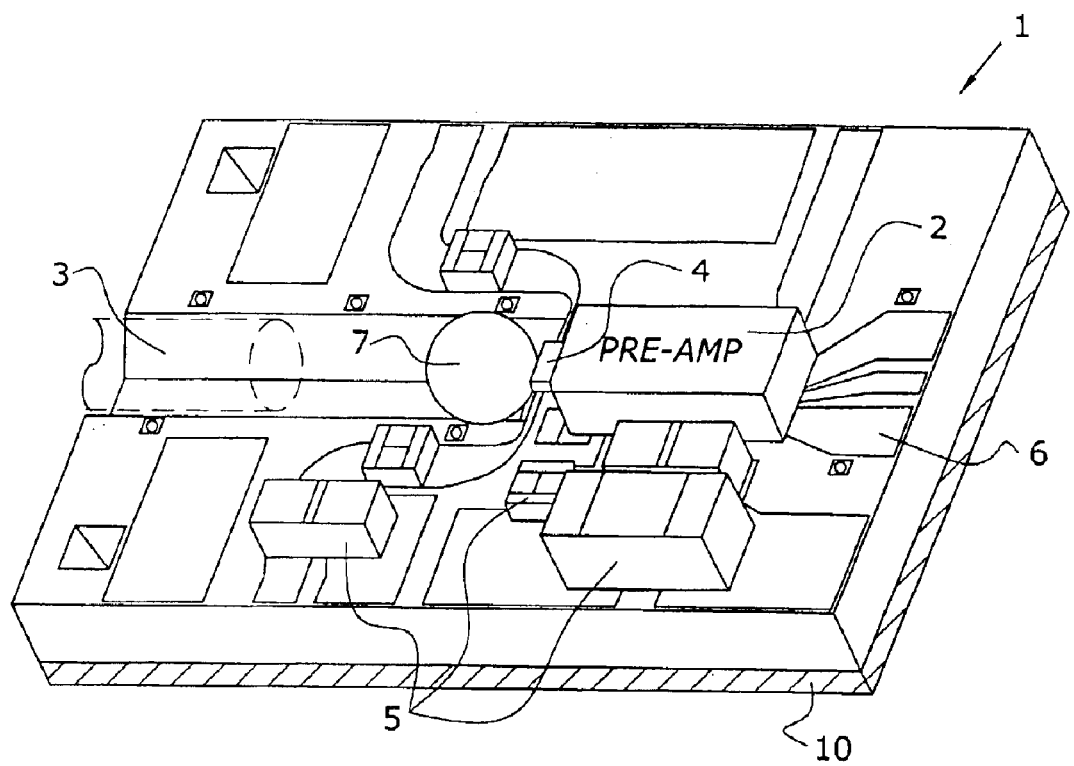
FIG. 1 is an isometric drawing of a preferred embodiment of an optical wire board of the present invention.

FIG. 1 is an illustration of a preferred embodiment of the optical wire board of the present invention. As shown, substrate board 1 contains integrated circuit 2, optical cavity 3, active optical device 4, electronic biasing components 5, RF transmission line 6, and an optical element 7 (in this example, a ball lens). RF transmission line 6 is provided for propagating RF signals between integrated circuit 2 and external circuitry (not shown), such as a signal amplifier or the like, which are well-known in the art.

Active optical device 4 may comprise any one of a number of well-known high speed sources or detectors, such as a laser or LED (as sources), or a PIN or uni-traveling-carrier (UTC) photodiode (as a detector). The operation of these various active optical devices is well-known to those of ordinary skill in the art and will not be elaborated upon here. Active optical device 4 is aligned using visual systems and fiducial alignment markings on both active device 4 and optical wire board 1. Optical cavity 3 is used to couple light between active optical device 4 and an optical fiber (shown in phantom) mounted in optical cavity 3. Optical element 7 is typically a ball lens, but is not limited thereto. Optical element 7 is preferably attached to cavity 3 using AlO bonding, but alternative methods of attachment can also be used.

Optical cavity 3 preferably contains a V-shaped groove for accurate passive alignment of ball lens 7 (and the associated optical fiber) with active optical device 4. Those of ordinary skill in the art will appreciate that systems for passive alignment of the optical fiber to active device 4 are not particularly limited, and may comprise any passive alignment mechanism capable of being mounted on substrate board 1.

Figure 2:
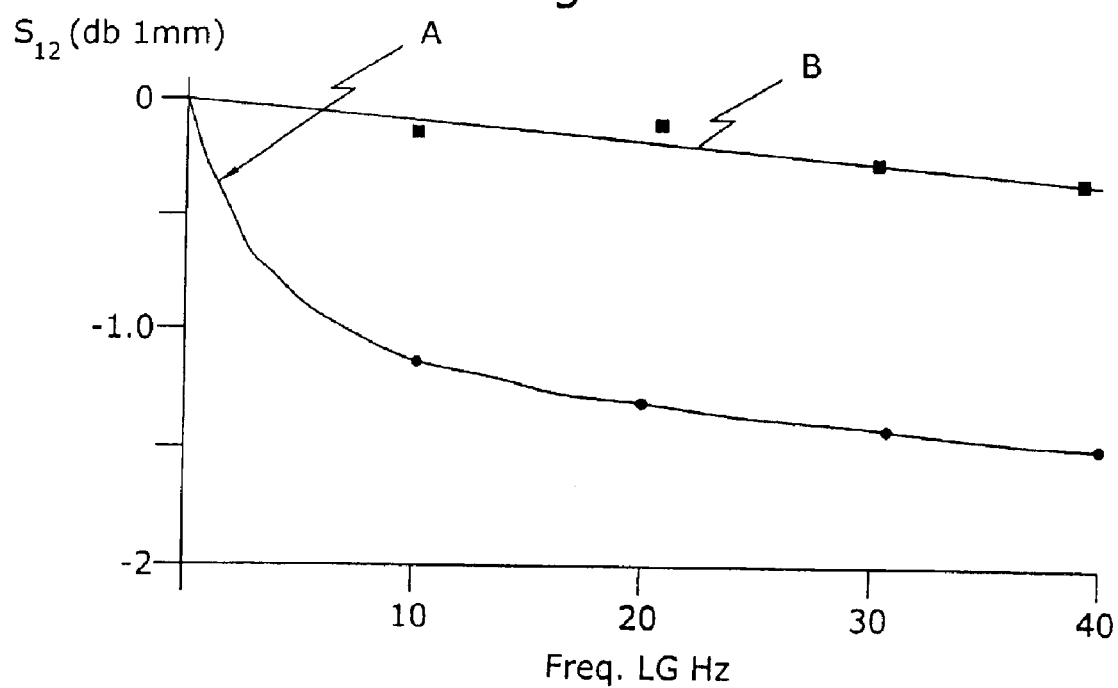
FIG. 2 is a graph of insertion loss per unit length as a function of frequency for both a prior art 50Ω transmission line and an equivalent 50Ω transmission line formed on the optical wire board of the present invention.

Substrate board 1 is preferably comprised of a silicon optical bench (SiOB) structure. The use of a silicon substrate in the manner of the present invention for the mounting of both the optical components and the electrical circuit provides significant advantages over the prior art, including improved RF performance and reduced transmission line insertion loss. In particular, proper processing of the silicon during the manufacture of the SiOB can reduce insertion loss to approximately 0.3 dB/mm at 40 GHz. This can be achieved, for example, by using advanced CMOS oxidation techniques and post-processing hydrogen annealing to minimize interface states. A conventional high resistivity (~5 kΩ-cm) silicon substrate is highly lossy at microwave frequencies, where the loss can be attributed to fixed charges that exist along the interface between the silicon substrate and the overlying oxide insulation layer. These interface states induce an inversion layer in the silicon that causes increased attenuation in the transmitted signal. Using advanced CMOS oxidation techniques, such as a multiple number of clean/rinse cycles, followed by oxidation in a combined $O_2/N_2$ ambient, have been found to improve the quality of the oxide layer and reduce the number of interface states between the silicon substrate and the oxide. FIG. 2 contains a graph illustrating the reduction in insertion loss that can be attributed to using an oxide layer formed using advanced CMOS techniques. Curve A in FIG. 2 illustrates the insertion loss per unit length versus frequency of a co-planar waveguide (CPW) transmission line formed on a silicon substrate. This CPW structure included a conventionally grown oxide layer of a thickness of approximately 5000 Å. As shown, at an operating frequency of 10 GHz, the insertion loss per unit length has increased to approximately 1.1 dB/mm. The loss further increases to approximately 1.5 dB/mm at 40 GHz. In comparison, curve B in FIG. 2 is associated with a similar CPW transmission line structure, this time including an oxide grown using the advanced CMOS processing techniques mentioned above. It is evident that the insertion loss per unit length in such a structure is significantly reduced, falling to a value of only approximately 0.1 dB/mm at 10 GHz, and to roughly 0.3 dB/mm at 40 GHz.

Because of the precision with which silicon can be etched, the use of a silicon board (in contrast to $Al_2O_3$) in the manner of the present invention provides the significant advantage that optical element 7 can be passively aligned with active optical device 4, such as through the use of the aforementioned V-groove, providing a significant savings in production costs. Moreover, the optical components may be mounted on the same substrate as the electrical components, providing further significant savings in product cost.

In addition, since silicon is thermally well-matched with indium phosphide (InP) laser diodes, photodetectors and/or integrated circuits (as well as gallium arsenide (GaAs) integrated circuits), significantly improved thermal conductivity while minimizing thermal stresses can be achieved, with precise features, by using conventional photolithographic processes. The use of silicon in the manner of the present invention also allows for precise micro-machining for optical element placement, as well as multiple metalization systems that are compatible with soldering, RF transmission, AlO bonding, wire bonding, and epoxy bonding with integrated passive electrical components.

Referring back to FIG. 1, electrical biasing components 5 are included for properly biasing active optical device 4 and integrated circuit 2. For example, biasing components 5 may include integrated RF bypass capacitors and resistors for noise filtering of active optical device 4 and integrated circuit 2. In the preferred embodiment of the present invention, the metalization preferably comprises titanium (Ti), titanium nitride (TiN), platinum (Pt), gold (Au) and/or chromium (Cr). Titanium and aluminum (Al) are preferably used for AlO bonding, and $SiO_2$ is preferably used for RF transmission, formed using the advanced CMOS processing techniques discussed above.

In accordance with the present invention, tantalum nitride may be used to form the integrated resistors and resistor passivation in biasing components 5. The integrated capacitor elements within components 5 may include a-SiOH:H and/or a-SiN:H as the dielectric material. It will be apparent to those skilled in the art that additional materials such as $Ta_2O$, $BuTiO_3$, and others, could also be used as the capacitor dielectric. Furthermore, other resistive materials—such as nichrome—could be used as the resistor.

Figure 3:
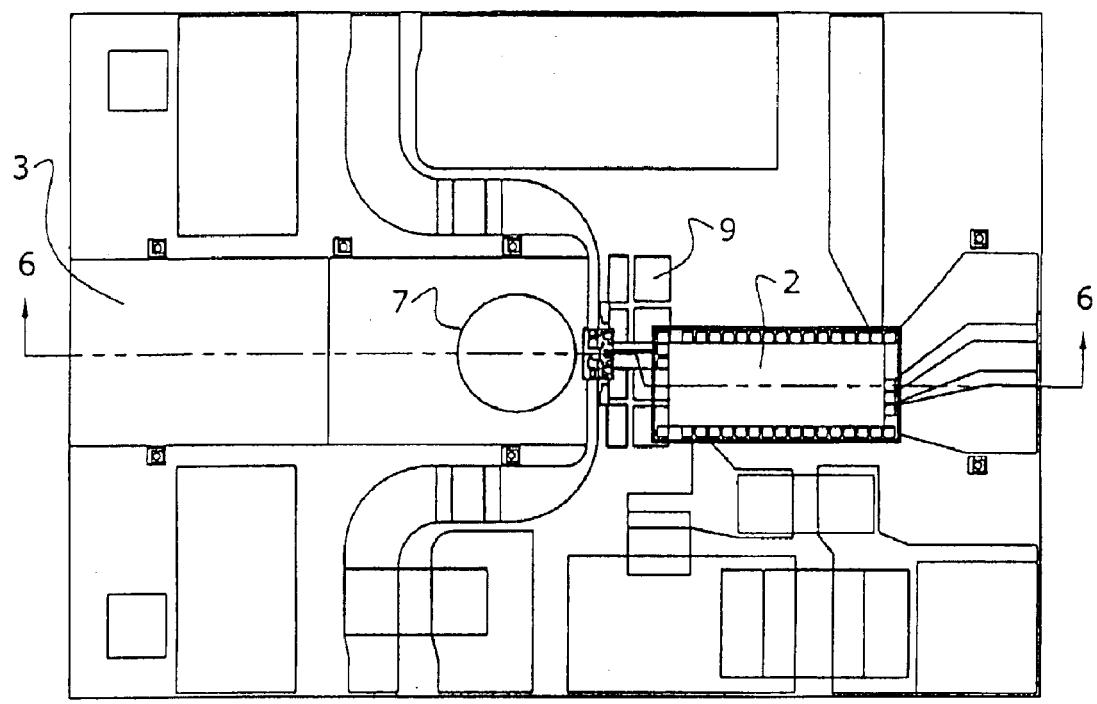
FIG. 3 is a top view of a preferred embodiment of an optical wire board of the present invention.
Figure 4:
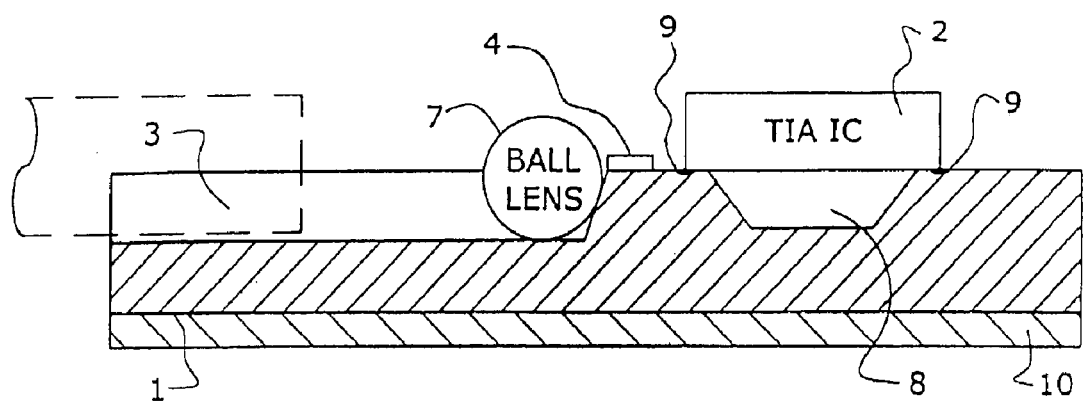
FIG. 4 is a cross-sectional view of the optical wire board of FIG. 4, taken along line 3—3.

FIG. 3 contains a top view of a preferred embodiment of the optical wire board of the present invention, and the mounting of the integrated circuit thereon. FIG. 4 is a cross-sectional view of the optical wire board as taken along line 4—4 of FIG. 3. As shown in FIGS. 3 and 4, integrated circuit 2 is preferably flip-chip mounted over integrated circuit cavity 8 atop bond pads 9. "Flip-chip" mounting is a technique well-known in the art for bonding the top, active surface of an integrated circuit to a substrate, the bonding comprising the plurality of electrical interconnections required between the integrated circuit and other components on the board. Flip-chip mounting of the integrated circuit onto the silicon substrate minimizes the parasitic inductance associated with this interconnection, which leads to improved RF performance. The use of bond pads 9 and a silicon substrate in the manner of the present invention provides the significant advantage of allowing for more precise placement of integrated circuit 2 over a more accurately etched cavity 8. The use of $SiO_2$ in the manner of the present invention provides the distinct advantage over $Al_2O_3$ wire boards in that reactive ion etching (RIE) can be used to achieve this extremely precise etching of integrated circuit cavity 8.

In the preferred embodiment of the invention, the optical wire board has specific dimensions for each of the aforementioned components. These dimensions provide the substantially optimal RF characteristics for the device. For example, the stray electromagnetic fields induced by the presence of an RF signal on the underside of integrated circuit 2 will extend downward toward silicon substrate 1. The depth of field penetration into the silicon substrate will depend largely upon the dimensions of the transmission line structure on the integrated circuit, as well as the type of transmission line structure (e.g., co-planar waveguide or microstrip). The close proximity of silicon substrate 1 to integrated circuit 2 will increase the effective dielectric constant of the resultant structure, thus potentially degrading (i.e., detuning) the RF performance if the field penetration into the silicon substrate is substantial. The depth of cavity 8, therefore, can be properly determined by knowing the dimensions and type of transmission line structure used on integrated circuit 2, where in the best case, most of the stray electromagnetic fields will be confined to the "air gap" created by the cavity, and will not reach into the underlying silicon substrate. For integrated circuit 2 utilizing co-planar waveguide transmission lines, the thickness of the IC is typically greater than 200 $\mu$m thick, while the thickness of an IC using microstrip transmission lines is typically less than 100 $\mu$m thick. Bond pads 9 are preferably 100 $\mu$m square and allow integrated circuit 2 to be flip-chip mounted directly over integrated circuit cavity 8.

The minimum thickness for silicon substrate 1 is determined by the depth of optical cavity 3 and the size of optical element 7. It is also a function of the dimensions and structure of RF transmission line 6. The preferred embodiment for RF transmission line 6, as shown in FIG. 1, is a co-planar waveguide structure. In this structure, the penetration depth of electromagnetic fields into silicon substrate 1 is approximated by taking the sum of one-half the width of the center electrode plus the gap to the adjacent ground plane lines. For optimal performance of RF transmission line 6, the thickness of silicon substrate 1 is preferably greater than this value.

Integrated circuit cavity 8 is preferably approximately 100 $\mu$m deep (depending on the dimensions and type of transmission line on the integrated circuit, as well as the substrate dielectric) and is preferably substantially co-extensive with the exposed area of integrated circuit 2, so that integrated circuit cavity 8 is etched essentially everywhere except under bond pads 9. It is preferred that bond pads be within 10 $\mu$m, and more preferably within 1 $\mu$m, of the sidewalls of integrated circuit cavity 8. While the sidewalls of cavity 8 are shown as slanted in FIG. 3, it is preferred that the sidewalls be substantially perpendicular to the top and bottom surfaces of board 1.

Although this invention has been described with reference to particular embodiments, it will be appreciated that many variations may be resorted to without departing from the spirit and scope of this invention, as defined in the following claims.

What is claimed is:

1. An optical wire board comprising:
    a silicon-based substrate, said substrate having an electrical transmission line provided thereon;
    an active optical device disposed on said silicon-based substrate;
    an integrated circuit connected to said electrical transmission line, said integrated circuit being positioned on said silicon substrate over an integrated circuit cavity, wherein said integrated circuit cavity is substantially co-extensive with said integrated circuit to minimize the dielectric loading effect of said silicon substrate on said integrated circuit; and
    biasing circuitry disposed on said silicon substrate and connected to said electrical transmission line for operating said active optical device in conjunction with said integrated circuit.

2. The optical wire board of claim 1 wherein the board further comprises an optical subassembly provided on said silicon substrate, said optical subassembly comprising an optical cavity for mounting an optical element and an alignment arrangement for passively aligning said optical element to the active optical device.

3. The optical wire board of claim 2, wherein the alignment arrangement for passively aligning the optical element to the active optical device comprises a V-shaped groove formed in the optical cavity on the silicon substrate, with a ball lens disposed in said optical cavity on said silicon substrate.

4. The optical wire board of claim 1, wherein said electrical transmission line contains metallization of one or more constituents selected from the group consisting of Ti, TiN, Pt, Au and Cr.

5. The optical wire board of claim 1, wherein the biasing circuitry includes integrated resistors, with $Ta_2N$ used for the integrated resistors.

6. The optical wire board of claim 1, wherein the biasing circuitry includes integrated capacitors, with a-SiOH:H and/or SiN:H used for the dielectric material in said capacitors.

7. The optical wire board of claim 1, wherein the integrated circuit is flip-chip mounted to the silicon substrate.

8. The optical wire board of claim 1, wherein the integrated circuit is mounted on bond pads over edges of the integrated circuit cavity and said bond pads are within at least about 10 $\mu$m of said edges of said cavity.

9. The optical wire board of claim 1 wherein the board further comprises an oxide layer with a minimal number of interface states formed between the silicon-based substrate and the electrical transmission line to minimize RF insertion loss.

10. An optical wire board comprising:
    a silicon-based substrate, said substrate having an electrical transmission line provided thereon;
    an active optical device disposed on said silicon-based substrate;
    an integrated circuit connected to said electrical transmission line, said integrated circuit being flip-chip mounted on pads provided on said silicon substrate over an integrated circuit cavity and within at least about 10 $\mu$m of the edges of said cavity, wherein said integrated circuit cavity is substantially co-extensive with said integrated circuit to minimize the dielectric loading effect of said silicon substrate on said integrated circuit; and
    biasing circuitry disposed on said silicon substrate and connected to said electrical transmission line for operating said active optical device in conjunction with said integrated circuit.

11. The optical wire board of claim 10, further comprising an optical subassembly provided on the silicon substrate, said optical subassembly comprising an optical cavity for mounting an optical element and an alignment arrangement for passively aligning said optical element to said active optical device.

12. The optical wire board of claim 11, wherein the alignment arrangement for passively aligning the optical element to the active optical device comprises a V-shaped groove formed in said optical cavity on the silicon substrate and a ball lens disposed in said optical cavity on said silicon substrate.

13. The optical wire board of claim 10, wherein the electrical transmission line contains metallization of one or more constituents selected from the group consisting of Ti, TiN, Pt, Au and Cr.

14. The optical wire board of claim 10, wherein the biasing circuitry includes integrated resistors, with $Ta_2N$ used for said integrated resistors.

15. The optical wire board of claim 10, wherein the biasing circuitry contains integrated capacitors, with a-SiOH:H and/or SiN:H used for said capacitors.

16. The optical wire board of claim 10 wherein the board further comprises an oxide layer with a minimal number of interface states formed between the silicon-based substrate and the electrical transmission line to minimize RF insertion loss.

17. An optical wire board comprising:

a silicon-based substrate, said substrate having an electrical transmission line provided thereon;

an active optical device disposed on said silicon-based substrate;

an integrated circuit connected to said electrical transmission line, said integrated circuit being positioned on said silicon substrate over an integrated circuit cavity, wherein said integrated circuit cavity is substantially co-extensive with said integrated circuit to minimize the dielectric loading effect of said silicon substrate on said integrated circuit;

biasing circuitry disposed on said silicon substrate and connected to said electrical transmission line for operating said active optical device in conjunction with said integrated circuit; and an optical subassembly disposed on said silicon substrate, said optical subassembly comprising an optical cavity for mounting an optical element and an alignment means for passively aligning said optical element to said active optical device.

18. The optical wire board of claim 17 wherein the integrated circuit is flip-chip mounted on pads over edges of the integrated circuit cavity and said pads are within at least about 10 $\mu$m of said edges of said cavity.

* * * * *